(12) United States Patent  
Marvasti et al.

(10) Patent No.: US 8,751,867 B2
(45) Date of Patent: Jun. 10, 2014

(54) METHOD AND APPARATUS FOR ROOT CAUSE AND CRITICAL PATTERN PREDICTION USING VIRTUAL DIRECTED GRAPHS

(75) Inventors: Mazda A. Marvasti, Coto de Caza, CA (US); Arnak Poghosyan, Yerevan (AM); Ashot Harutyunyan, Yerevan (AM); Naira Grigoryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 194 days.

(21) Appl. No.: 13/271,554

(22) Filed: Oct. 12, 2011

(65) Prior Publication Data

US 2013/0097463 A1    Apr. 18, 2013

(51) Int. Cl.
G06F 11/00    (2006.01)

(52) U.S. Cl.
USPC ............................. 714/26; 714/4.1; 709/223

(58) Field of Classification Search
USPC .......................................................... 714/26
See application file for complete search history.

(56) References Cited

U.S. PATENT DOCUMENTS

| | | | | |
|---|---|---|---|---|
| 6,751,746 B1 * | 6/2004 | Jain et al. | ...................... | 714/4.12 |
| 7,853,599 B2 * | 12/2010 | Liu et al. | ........................ | 707/748 |
| 7,886,046 B1 * | 2/2011 | Zeitoun et al. | ................ | 709/224 |
| 8,291,054 B2 * | 10/2012 | Rudy et al. | ..................... | 709/222 |
| 8,463,641 B2 * | 6/2013 | Reddy | ........................... | 705/7.41 |
| 2007/0300170 A1 * | 12/2007 | Bier et al. | ...................... | 715/764 |
| 2009/0094076 A1 * | 4/2009 | Reddy | ............................... | 705/7 |
| 2009/0132861 A1 * | 5/2009 | Costa et al. | .................... | 714/45 |
| 2009/0300150 A1 * | 12/2009 | Rudy et al. | ..................... | 709/222 |

* cited by examiner

*Primary Examiner* — Kamini Patel

(57) ABSTRACT

An approach to root cause determination in a complex systems based on monitoring and event data is disclosed. It includes a historical analysis of events with their probabilistic correlations. Applying information measures between the random variables which embody those events one can detect origins of problems and generate real-time recommendations for their locations in a hierarchical system. Estimation of system bottlenecks, as well as the risk of "black swan"-type events are also computed. The processes are based on a statistical processing of a virtual directed graph produced from historical events.

20 Claims, 13 Drawing Sheets

| 1 | $X_4(E_4)$ |
|---|---|
| 2 | $X_1(E_1)$ |
| 3 | $X_5(E_5)$ |
| 4 | $X_3(E_3)$ |

FIG. 6

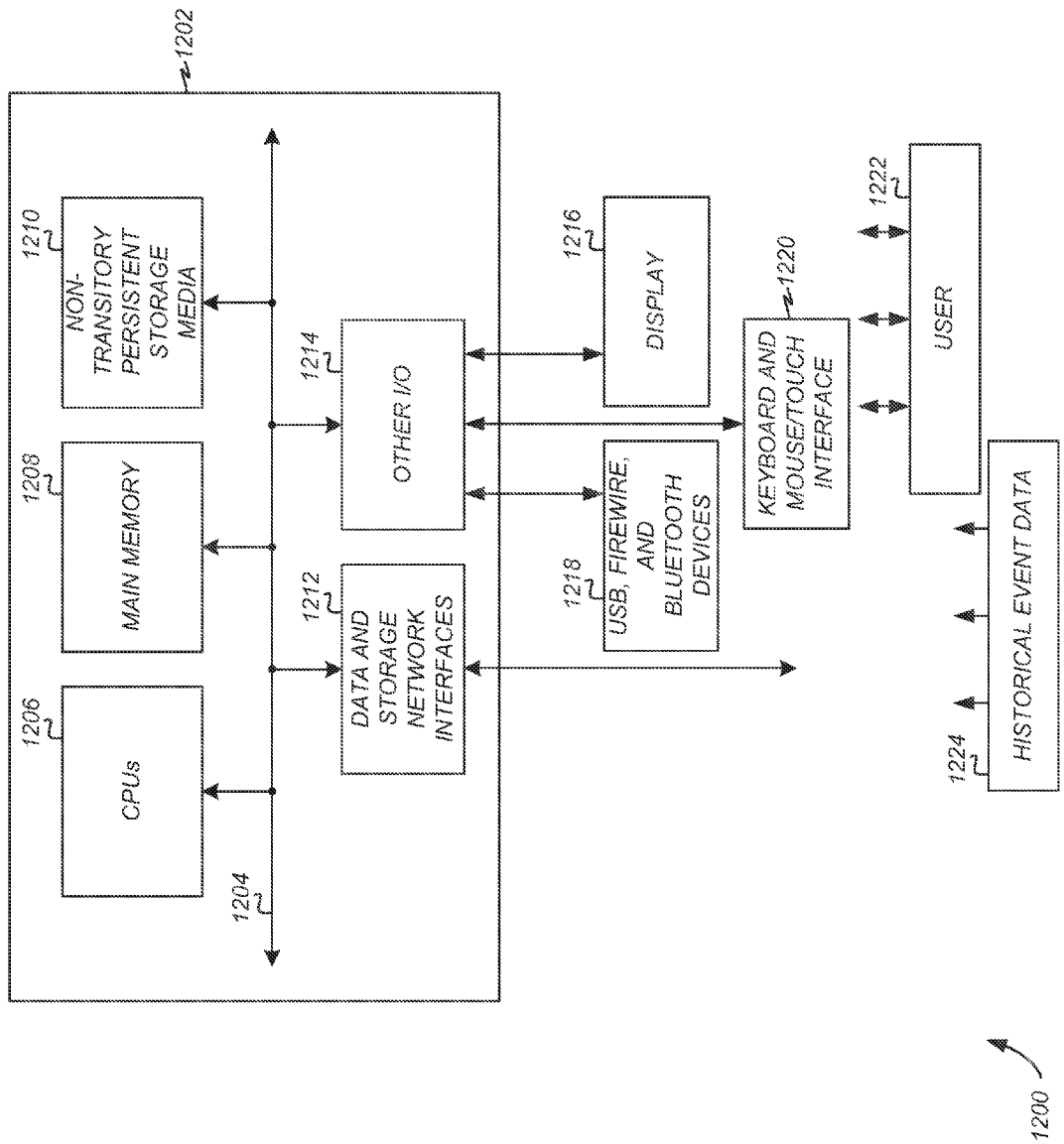

METHOD AND APPARATUS FOR ROOT CAUSE AND CRITICAL PATTERN PREDICTION USING VIRTUAL DIRECTED GRAPHS

BACKGROUND

In the art of computing, along with other arts, it is often desirable to correlate events. Some events are relatively easy to correlate. For example, if a notebook computer having a mechanical hard drive is dropped and the hard drive fails, one may conclude with a high degree of confidence that the "dropping" event caused the "failure" event.

Conversely, some events are difficult to correlate. For example, if a server fails in a data center, there may not be a cause that is readily apparent. However, there are many factors that could have contributed to the failure, including temperature, humidity, air purity, vibration, altitude, workloads, adjacent equipment, installed components, and latent product defects. Accordingly, it can be difficult to form causal correlations between certain events.

SUMMARY

This disclosure relates to devices, systems, and methods for determining root causes of events in complex systems. The devices, systems, and methods of this disclosure can be used to detect problems in real-time, and determine sources of bottlenecks and of black swan events.

An approach to root cause determination in a complex systems based on monitoring and event data is disclosed. It includes a historical analysis of events with their probabilistic correlations. Applying information measures between the random variables which embody those events, one can detect origins of problems and generate real-time recommendations for their locations in a hierarchical system. Estimation of system bottlenecks, as well as the risk of "black swan"-type events are also computed. The processes are based on a statistical processing of a virtual directed graph produced from historical events.

According to this disclosure, a method for determining a causative event in an information technology infrastructure is disclosed comprising collecting historical event data with a computer, generating an undirected graph, each node being an event and each edge being a probability of those events historically occurring simultaneously, reducing the undirected graph, determining graph adjacency of the undirected graph, generating a directed graph, each node being the event and each edge being the conditional probability of a second event occurring if the first event occurs, and from the directed graph, creating and outputting an historical list of recommendations to a user, the historical list of recommendations comprising an at least one event deemed to be the most likely causative event.

According to this disclosure, a machine readable medium with instructions stored thereon for determining a causative event in an information technology infrastructure is disclosed, the instructions comprising collecting historical event data with a computer, generating an undirected graph, each node being an event and each edge being a probability of those events historically occurring simultaneously, reducing the undirected graph, determining graph adjacency of the undirected graph, generating a directed graph, each node being the event and each edge being the conditional probability of a second event occurring if the first event occurs, and from the directed graph, creating and outputting an historical list of recommendations to a user, the historical list of recommendations comprising an at least one event deemed to be the most likely causative event.

DRAWINGS

The above-mentioned features and objects of the present disclosure will become more apparent with reference to the following description taken in conjunction with the accompanying drawings wherein like reference numerals denote like elements and in which:

FIG. 6 is a table of illustrating a list of exemplary nodes in descending order of impact or ascending order of entropy (Xi) for the graph of FIG. 4;

FIG. 12 is a block diagram of a representative computing environment that may be used to host example processes, methods, and analyzers.

DETAILED DESCRIPTION

Figure 1:
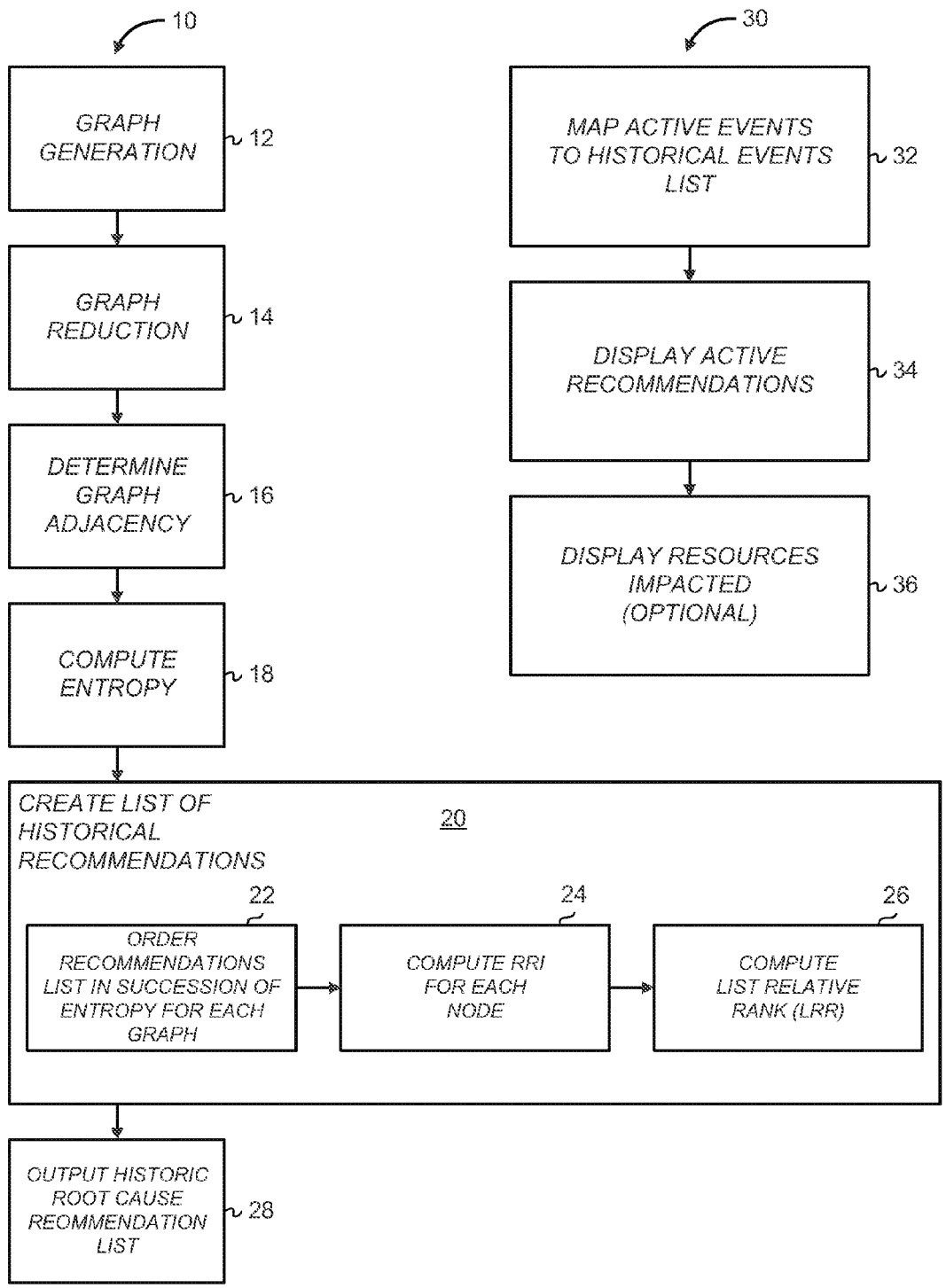
FIG. 1 is a flow chart of an embodiment of process for determining historical lists of recommendations and comparing historical lists of recommendations to real-time events.

In the following detailed description of embodiments of the present disclosure, reference is made to the accompanying drawings in which like references indicate similar elements, and in which is shown by way of illustration specific embodiments in which the present disclosure may be practiced. These embodiments are described in sufficient detail to enable those skilled in the art to practice the present disclosure, and it is to be understood that other embodiments may be utilized and that logical, mechanical, electrical, functional, and other changes may be made without departing from the scope of the present disclosure. The following detailed description is, therefore, not to be taken in a limiting sense, and the scope of the present disclosure is defined only by the appended claims. As used in the present disclosure, the term "or" shall be understood to be defined as a logical disjunction and shall not indicate an exclusive disjunction unless expressly indicated as such or notated as "xor."

As used herein, the term "event" shall be defined as a source, a metric, and a reason or symptom. A "real event"

shall be defined as a source, a metric, a reason or symptom, and a time or time interval. The devices, systems, and methods of this disclosure are concerned with event data wherein the time or time interval of a real event is removed, whereby the same events (source, metrics, reason/symptom) can be analyzed time independently to correlate the occurrence of other events.

As used herein, the term "real-time" shall be defined as the instantaneous moment of an event, analysis, or condition, or the instantaneous moment of an event or condition plus a period of elapsed time used to make relevant measurements, computations, transformations, comparisons, recommendations, or decisions (e.g., to do something useful with the data that takes the period of elapsed time), wherein the state of an event, analysis, or condition being measured is substantially the same or remains similarly useful as that of the instantaneous moment irrespective of the elapsed time necessary to make the measurement, computation, transformation, comparison, recommendation, or decision. Used in this context "substantially the same" shall be understood to mean that the data for the event, analysis, or condition remains useful for the purpose for which it is being used after the elapsed time period.

As used herein, the term "subgraph" shall refer to a subset of nodes in a graph where the adjacency relation the subset of nodes is restricted to that subset of nodes. In other words, the subgraph is disconnected from other subgraphs in the graph (i.e., no node from the subgraph shares an edge with a node from any other subgraph in the graph).

This disclosure addresses determination of potential root causes in complex systems, such as information technology (IT) infrastructures. The devices, systems, and methods disclosed herein are useful for diagnosing causes or problems in the complex system, as well as for determining other useful information such as bottlenecks, black swans, critical nodes, sectors or paths, roots, and extreme paths in the complex system. The systems and methods disclosed herein require no contextual knowledge about the system it is applied to. Other similar processes rely on heavy utilization of rules and topology knowledge of the applications or systems to enable effective recommendations. The methods of this disclosure require no rules to determine the best recommendation to give to users, instead determining the relevant recommendations ab initio.

According to embodiments, the methods disclosed herein rely on information measures applied on the complex system events space, such as abnormality event spaces, to create a historical recommendation list of components (resources) to identify/localize root causes of a past behavior or event. Real-time events are mapped into those historical lists to create real-time recommendations. Sets of root cause lists are used to create ordered rank lists based on a computed "likelihood index" which identifies the most probable root cause event in the generated list.

No knowledge of casual and other relationships in the environment is necessary to practice the methods disclosed herein. The underlying analysis for the root cause recommendation is performed on the space of historical events produced on resources in the complex system that are being monitored, for example in an IT infrastructure.

The devices, systems, and methods disclosed herein are applicable to a wide range of complex systems, from information technology infrastructures to single machines. They are also applicable to a wide range of other applications such as financial performances or sports applications. The application outside of an information technology infrastructure requires only that a user specify a set of events to analyze.

According to embodiments, methods are disclosed for identifying a list of events (nodes) that are likely to be the source of the root cause of a real event in the complex system. According to embodiments, the real event comprises an abnormal event, and the root cause identification allows the user of the complex system to identify the source or event that initiated the abnormal event. According to embodiments, the method comprises creating from historical event data a directed graph of conditional probabilities between nodes (i.e., an event state). The directed graph is reduced to contain only relevant information. The resulting directed graph is analyzed to determine the events that are most likely to be the root cause of a past event and organized so that a user of the devices, systems, or methods disclosed herein can make use of the information.

According to embodiments, FIG. 1 illustrates a flow chart of the process for obtaining a historical root recommendations list and applying recommendations in real-time. FIG. 1 is divided into historical mode 10 and active mode 30. In historical mode 10, historical event data is gathered and used to determine and correlate root causes. The historical root cause data is stored for use in active mode 30, which uses real-time data from the complex system and evaluates risks by comparing the real-time data to the stored historical root cause data.

According to embodiments illustrated in FIG. 1, historical mode 10 comprises the following steps: graph generation 12, graph reduction 13, determination of graph adjacency 16, computation of impact factors (entropy) 18, creation of historical recommendations 20, and output of the historical root cause recommendation list 28. Within the creation of historical recommendations operation 20 and according to embodiments, recommendations list is initially proposed based on entropy in operation 22. Then, for each node a relative recommendation index (RRI) is created in operation 24, and finally a list relative rank (LRR) is determined to quantitatively compare subgraphs in operation 26.

Active mode 30, as illustrated in FIG. 1, comprises mapping of real-time or non-real-time active events to the historical events lists in operation 32, according to embodiments. Real-time or non-real-time recommendations are then output to a user in operation 34 and, optionally, impacted resources are also output to the user in operation 36. Each of the operations for both historic mode 10 and active mode 30 are described in greater detail below.

According to embodiments, a device or system can be used for performance of the operations disclosed herein. According to embodiments, such as system or device would be in data communication with the complex system whereby event data is collected by the device or system and the operations executed by the device or system. According to embodiments, historic data may be delivered to the device or system in database form (e.g., SQL or Oracle database), as log files, or other commonly accepted protocols for storing event data for complex systems including manual data entry. Delivery of such historical data, according to embodiments, can be via network or via other forms of machine readable media connected directly to the machine or system. For active mode, real-time or non-real-time data is delivered as is done for historic mode, both in format and delivery method, according to embodiments. One way to deliver real-time data for active mode is via network or direct monitoring of the metrics of the complex system that provide the event data.

Historical Mode

Creation of a Directed Graph and Probability Space

Figure 2:
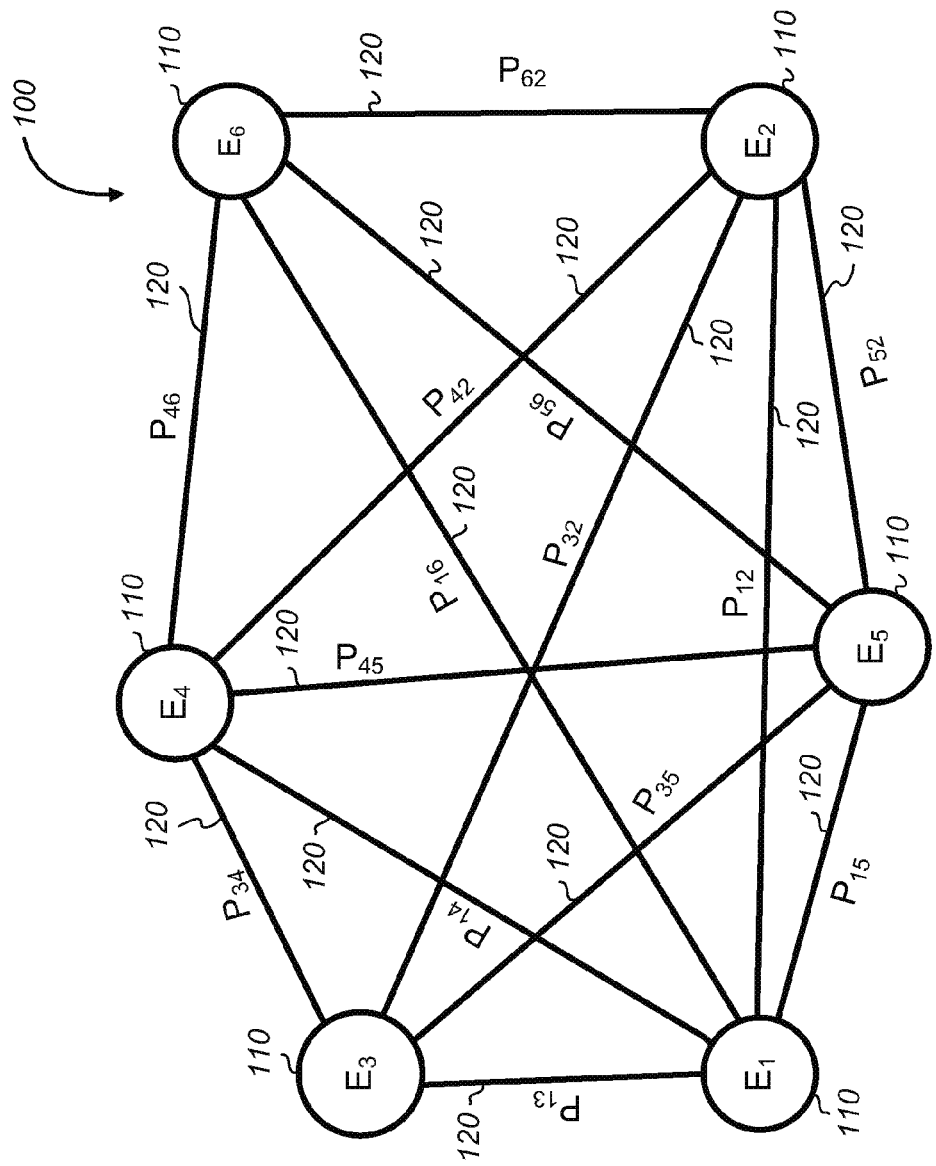
FIG. 2 is an embodiment of an undirected graph of events and probabilities for simultaneous occurrence of the events for an exemplary set of data.

Based on the available probability distributions, a graph of complex system events is created in operation 12. FIG. 2 illustrates a complete undirected graph of pair-wise events (nodes 110) with the edges 120 being the joint probability $P_{ij}=P(E_i,E_j)$ that the events occur simultaneously. The undirected graph is used reduced to remove event and probability data that is irrelevant or not useful. According to embodiments, novel probability theories are useful, provided they describe the probability of two nodes or events occurring within the same time interval (i.e., occurring within the same $\Delta t$).

According to embodiments, after the events and the probabilities are determined for the complex system, the undirected graph can be constructed as illustrated by exemplary graph 100 shown in FIG. 2. The graph comprises nodes no and edges 120. As previously disclosed, each node no represents an event and each edge 120 shows the probability of the two events represented by nodes 110 occurring simultaneously.

Conditional probabilities $P(E_i|E_j)$ are used for the edges 120 of another directed graph. According to embodiments, the construction of the directed graph is based upon events and probabilities between event pairs. The nodes of the graphs represent an event state and the connections between two nodes represent the conditional probability that if one event occurs, the other will subsequently occur. The actual method used to compute the conditional probability of two events includes Bayes theorem or derivatives of Bayes Theorem, for example.

According to embodiments, the conditional probability of events $(E_j,E_i)$ (e.g., the probabilities used to build the directed graph) can be computed by dividing the joint probability of the two events by the marginal probability of event $E_i$:

$$P(E_j | E_i, a, \Delta t) = \frac{P(E_i, E_j | a, \Delta t)}{P(E_i | a)}$$

where
$E_i$=Event i;
$E_j$=Event j;
$\alpha$=a function of the event lifetimes; and
$\Delta t$=the span of time where events i and j are considered to be coincident.

According to embodiments, information theory is used to derivatize Bayes Theorem. For example, in an IT infrastructure, an alert (i.e., an event) lifetime has approximately a log normal distribution. Based on this model of an alert's lifetime, the log normal distribution was derivatized into Bayes Theorem.

Accordingly, the function a can be computed by an approximate modeling of event lifetimes. This is accomplished by representing a typical event lifetime as a log-normal distribution (other choices are also possible, though an approximation is sufficient in this case):

$$f(t) = \frac{1}{t\sigma'\sqrt{2\pi}} e^{-\frac{1}{2}\left(\frac{\ln(t)-\mu'}{\sigma'}\right)^2}$$

$$\mu' \equiv \frac{1}{N}\sum_{i=1}^{N}\ln(t_i)$$

$$\sigma' \equiv \sqrt{\frac{1}{N-1}\sum_{i=1}^{N}(\ln(t_i)-\mu')^2}$$

where t is the time from the start to the end of the event. This is the standard definition of the log-normal distribution. Using a different convention:

$$t' \equiv \ln(t)$$

$$k' \equiv \frac{t'-\mu'}{\sigma'}$$

$$f(t') = \frac{1}{\sigma'\sqrt{2\pi}} e^{-\frac{1}{2}k'^2}.$$

Now the variable $\alpha$ can be defined as:

$$a \equiv \int_{-\infty}^{t'_a} f(t')dt'$$

which can be interpreted as the probability of the logarithm of time to be less than $t'_a$. In other words, rather than using the entire area under of the log normal distribution as the basis of the probabilities, only the area up to a certain time period $t'_a$ is used, according to embodiments.

Rewriting the integral yields:

$$a = \frac{1}{\sqrt{2\pi}} \int_{-\infty}^{k'_a} e^{-\frac{(k')^2}{2}} dk'.$$

According to embodiments, $t_a$ is obtained as:

$$t_a = e^{(\sigma'k'_a+\mu')}.$$

Figure 3A:
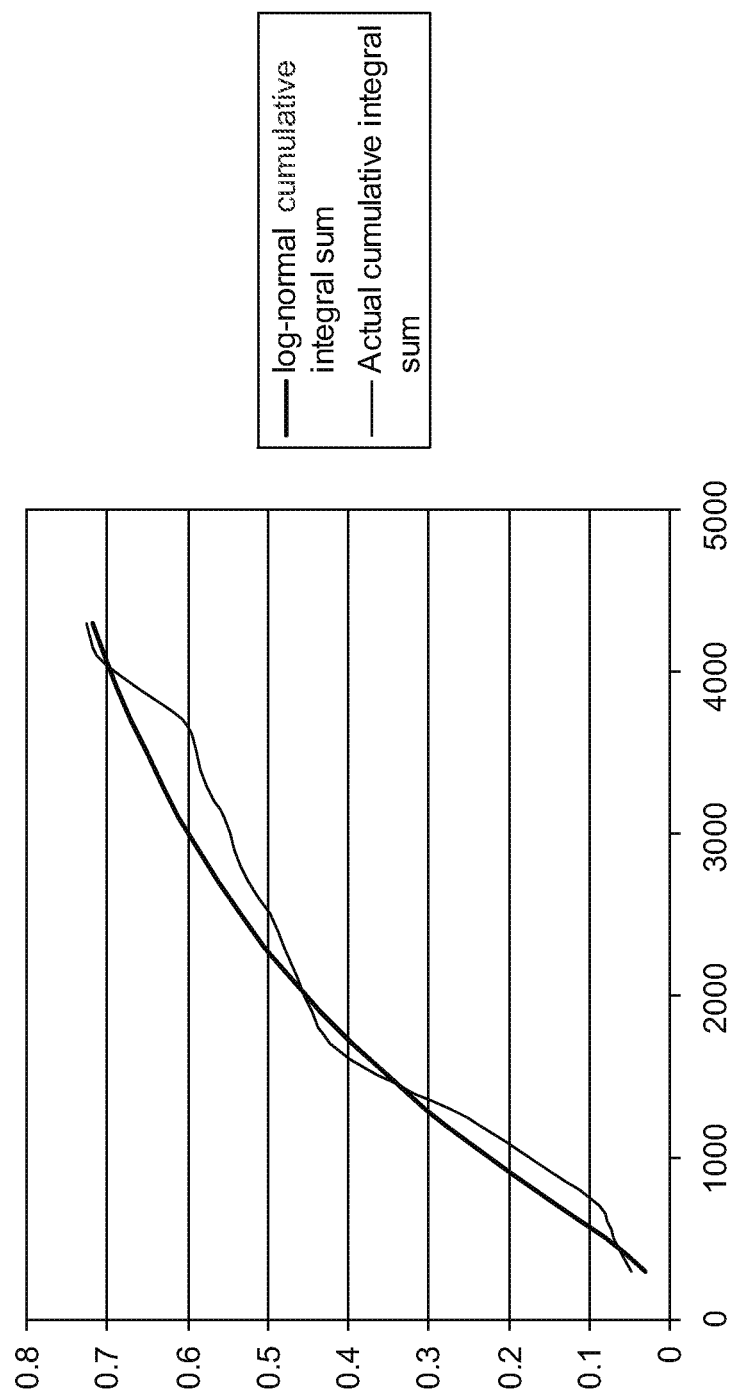
FIGS. 3A and 3B are graphs of exemplary data illustrating the cumulative distribution of the actual alert lifetimes vs. the log-normal distribution for two typical information technology (IT) infrastructure events.
Figure 3B:
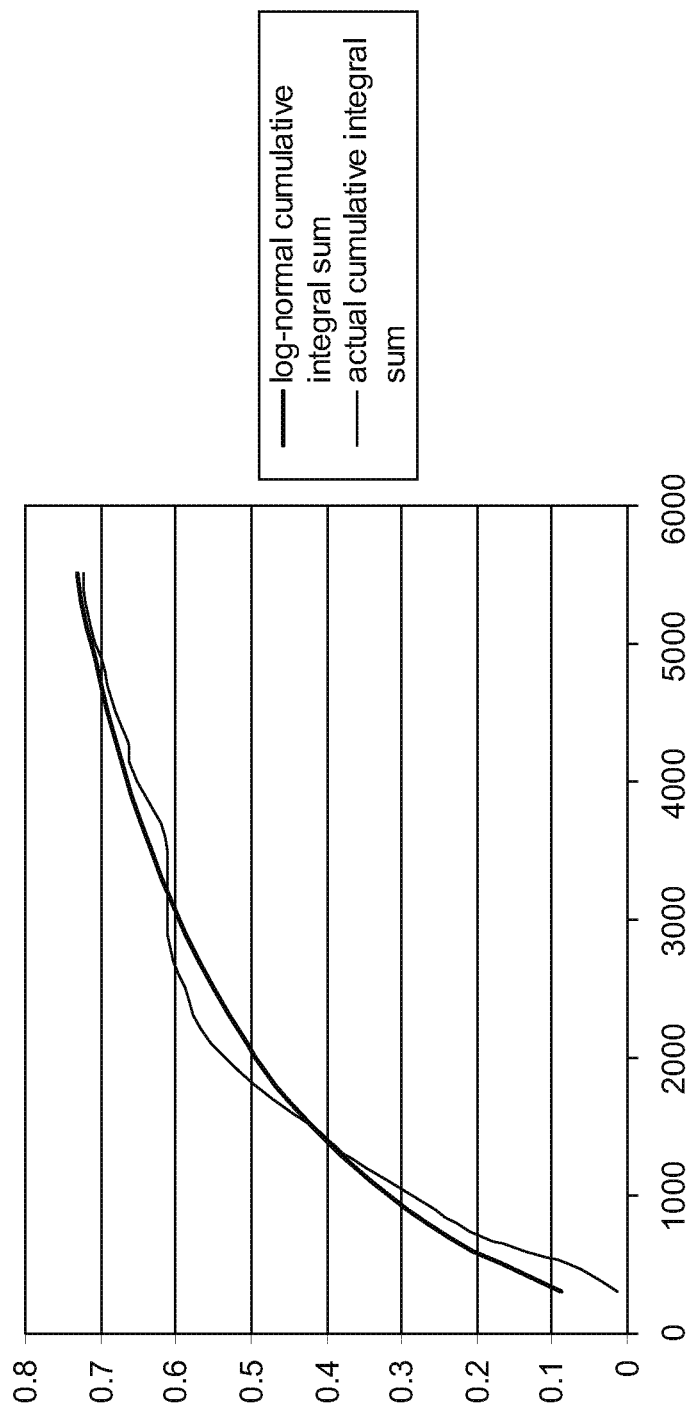

FIGS. 3A and 3B illustrate the effectiveness of the assumption of log-normal behavior for the alert (event) lifetime distribution as defined in the equations above for an exemplary set of data in the context of an IT infrastructure. FIGS. 3A and 3B show the cumulative distribution of the actual alert lifetimes versus the log-normal distribution for two typical IT infrastructure events. FIGS. 3A and 3B are representative of the various observed events in real IT infrastructure environments. Artisans will readily recognize that other models can be used depending on the data and the analysis being sought, as well as the distribution curve for their particular complex system.

According to embodiments, other methods of determining the conditional probability of two events are expressly contemplated, including other derivatives of Bayes Theorem, or other standard statistical methods for determination of conditional probability from which a directed graph can be constructed.

According to embodiments, the graphs are stored in a database table. According to embodiments, each node is represented at a row in the database table. For each row, columns will exist with various data, for example a list of the nodes in which edges are shared for the undirected graph, and a sub-table of nodes and conditional probabilities in the directed graph. Another column may list a node's prior probability, which is the probability that the event will occur on its own. According to other embodiments, each node pair can be represented in the table, together with prior probability, and conditional probability as the data fields. Many permutations of database storage of graphs are possible, and are well known and understood by artisans.

Graph Reduction

According to embodiments, after the undirected graph is created, it is reduced in operation 14. Reduction of the graph eliminates edges that are irrelevant or for which too little information is available to provide confidence in the calculated probability. Accordingly, it is possible that graph reduction will result in subgraphs. According to embodiments, reduction of the graph is an optional step that need not be performed.

Reduction is an optional step that reduces the amount of information in a graph to a more manageable level. When the undirected graph is created, it will typically be very large. In principle, reduction uses information theory to discard information in the graph that is irrelevant or statistically insignificant while still having confidence that the node (event) representing the root cause, or a critical path, black swan, etc. remains in the graph. Generally, graph reductions are imprecise; if too much information is removed from the graph, it is possible to remove the root cause event (node) or data necessary for determination of critical paths, bottlenecks, or black swans, for example. Conversely, if too much data is left in the graph, the time to execute the processes described herein can be greatly increased to the point where the system cannot process the information quickly enough or the list of potential root causes output to the user is too big to be meaningful. According to embodiments, a user can specify the amount of desired reduction with a sensitivity parameter setting. Accordingly, the user may need to undergo trial and error to determine a suitable sensitivity setting on a case by case basis.

According to embodiments, graph reduction is accomplished by computing the mutual information contained in the correlation between two different events:

$$I(E_i, E_j) = \sum_{l,m} P(E_{i_l}, E_{j_m}) \log \frac{P(E_{i_l}, E_{j_m})}{P(E_{i_l})P(E_{j_m})},$$

or its "point-wise" version (where each of the events has a unique realization denoted by the same letter):

$$I(E_i, E_j) = \log \frac{P(E_i, E_j)}{P(E_i)P(E_j)}.$$

In the latter form it is a measure of independence for the random realizations $E_i$ and $E_j$ (note that $I(E_i,E_j)=I(E_j,E_i)$).

A user defined sensitivity parameter $\epsilon \in [0,1]$ regulates the sensitivity of graph reduction, according to embodiments. The sensitivity parameter allows the user to introduce a control on tradeoff between the complexity and accuracy of the analysis, as described above.

According to embodiments, reduction is performed by computing the mutual information for each pair (i,j) and classifying those values according to their signs. For example, let $Q_{0.25}^+$ and $Q_{0.75}^+$ be the 0.25 and 0.75-quartiles of a positive data set, with similar notations for a negative data set.

Graph reduction eliminates nonessential correlation edges, for example by applying the whiskers model, where the interquartile range $(Q_{0.75}^+ - Q_{0.25}^+)$ is an important criterion. Namely, if $$I(E_i,E_j) < \Delta^+, \text{ for } I(E_i,E_j) \geq 0$$

or $$I(E_i,E_j) > \Delta^-, \text{ for } I(E_i,E_j) < 0$$

then the edge connecting the node i to j is eliminated, where $\Delta^+$ and $\Delta^-$ are defined by:

$$\Delta^+ = Q_{0.25}^+ - (0.5+\epsilon)(Q_{0.75}^+ - Q_{0.25}^+)$$

$$\Delta^- = Q_{0.75}^- + (0.5+\epsilon)(Q_{0.75}^- - Q_{0.25}^-).$$

The values for $Q^+$ and $Q^-$ do not need to be the 0.25 and 0.75 quartiles, according to embodiments, but can be set to any statistically significant range that discards edges in a meaningful way during the reduction of the graph. Note that in each of the computations presented above, the sensitivity parameter allows a user to adjust for when an edge is retained or discarded.

Figure 4:
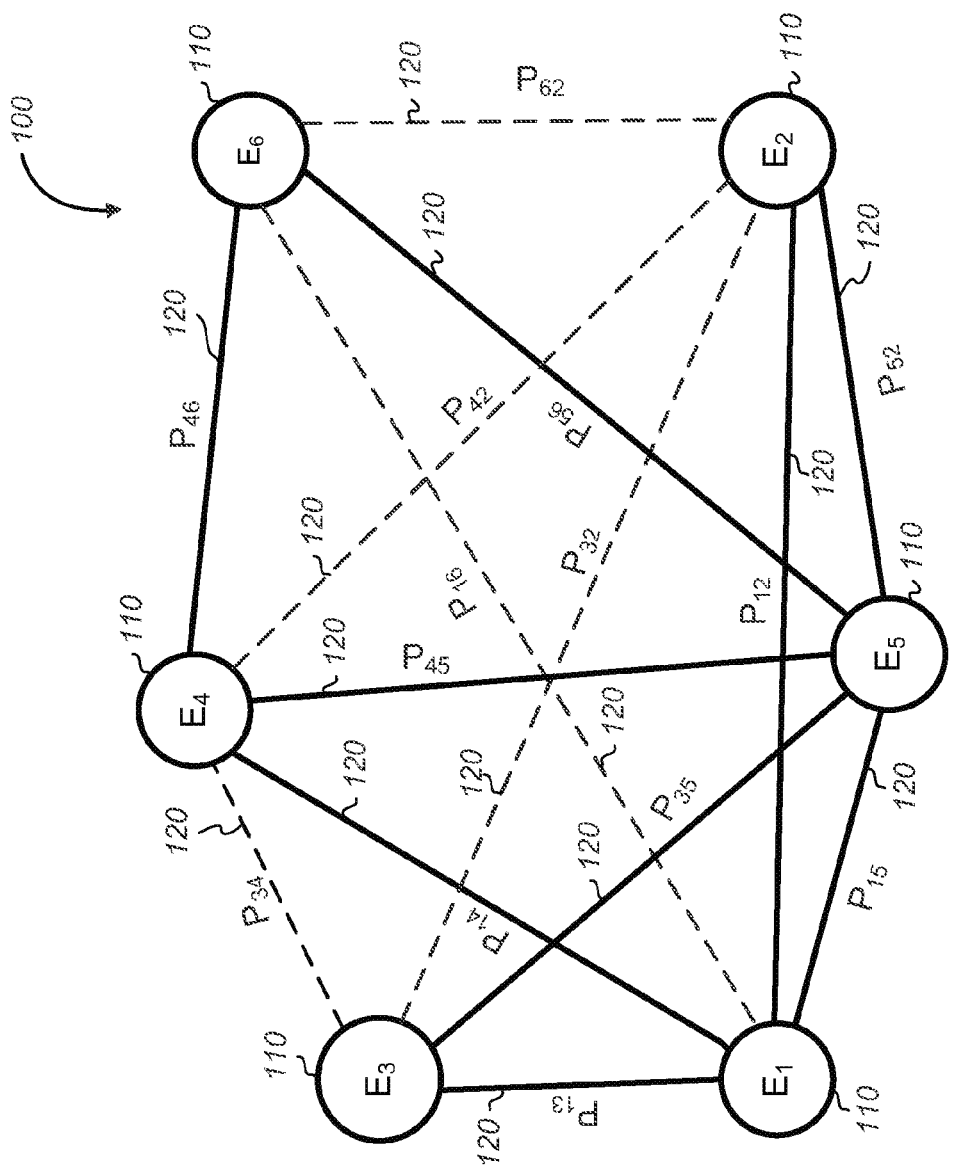
FIG. 4 is an undirected graph of events and probabilities between events in an exemplary set of data and indicating edges that are removable (dashed lines) based on graph reduction.
Figure 5:
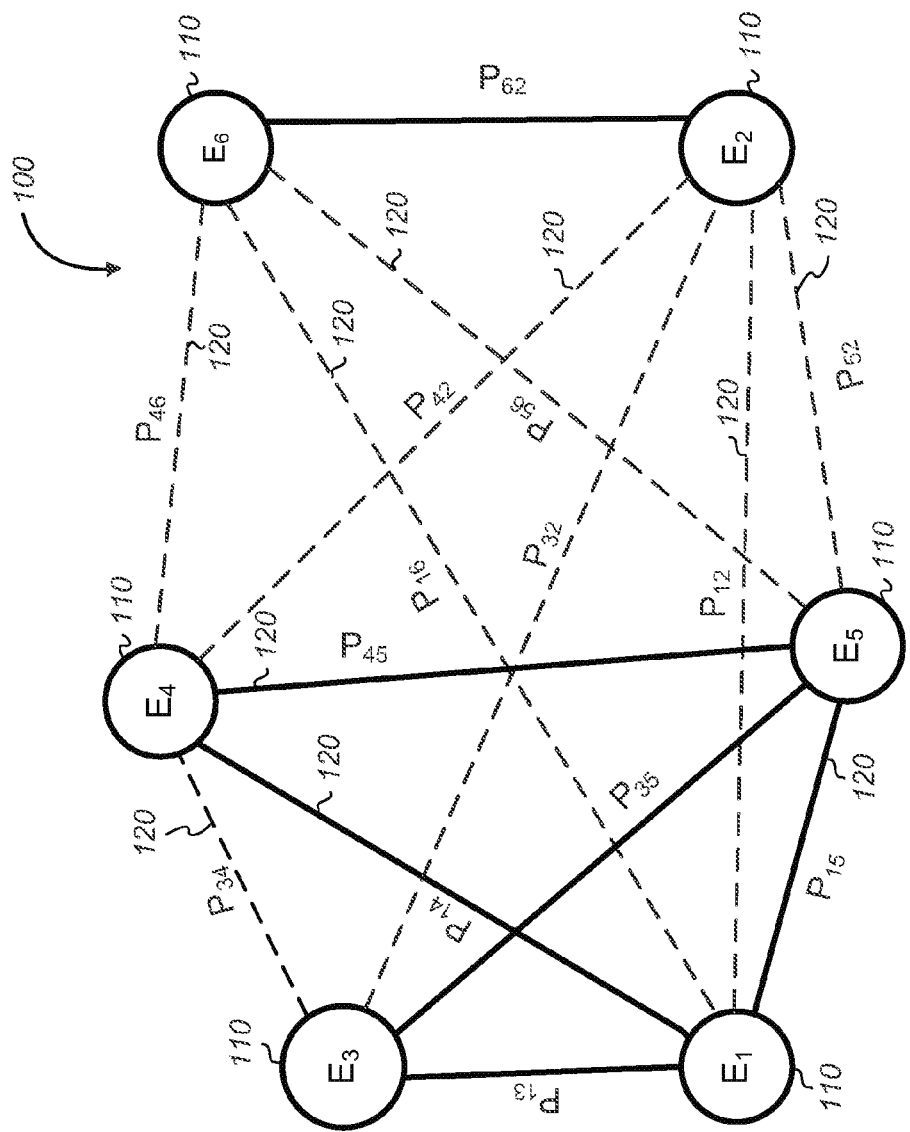
FIG. 5 is an undirected graph of events and probabilities between events in an exemplary set of data and indicating edges that are removable (dashed lines) based on graph reduction resulting in subgraphs.

For example, FIG. 4 illustrates the undirected graph of FIG. 2 after reduction. Edges 120 that have been removed are denoted with dashed lines. Likewise, FIG. 5 illustrates the same exemplary graph that, after reduction, results in two subgraphs. The first subgraph is the set of nodes {E1, E3, E4, E5}. The second subgraph is the set of nodes {E2, E6}. Note that the set of nodes for each subgraph does not share any edges with a node from the other subgraph.

Determine Graph Adjacency

According to embodiments, where the graph reduction operation 14 has been performed, the system determines whether subgraphs exist in the reduced or nonreduced subgraph. This determination is performed in the graph adjacency operation 16 of FIG. 1.

According to embodiments, to determine whether subgraphs exist, an adjacency matrix A(i,j) of the graph (A(i,j)=1 if $i^{th}$ and $j^{th}$ nodes are connected, otherwise A(i,j)=0) is created. According to embodiments, a bit-wise OR-ing algorithm is applied to the rows of this matrix (Narsingh Deo, "Graph Theory with Applications to Engineering and Computer Science", Prentice Flail 1974, hereby incorporated by reference) to detect the connectivity of the graph. If the graph is connected, graph adjacency operation 14 ends.

According to embodiments, in the case where the graph is not connected (i.e., subgraphs exist), each subgraph is identified. Use of a flood fill coloring algorithm (S. S. Skiena, "The Algorithm Design Manual," Springer 2008, hereby incorporated by reference) can be used to identify subgraphs, according to embodiments. The coloring algorithm requires three parameters: a start node, a target color, and a replacement color. The algorithm looks for all nodes in the array which are connected to the start node by a path of the target color. The nodes in the path are changed to the replacement color. At the end of each iteration with a given start node, all nodes that exist along a path from the start node will be colored by the replacement color. Nodes that are not colored with the replacement color belong to another subgraph. According to embodiments, after each iteration, a node that is not colored with the replacement color is designated as a new start node and the process is repeated until every node is the replacement color, which means that all nodes in the graph are represented in a subgraph.

Other algorithms for determining graph connectivity are also expressly contemplated according to embodiments and can be used in place of the flood fill algorithm described above, and include, for example: depth-first search, breadth-first search, Warshall's, Naïve Union Find, or Union Find with Path Compression algorithms.

Compute Entropy

Turning again to FIG. 1, after determining graph adjacency, entropies (impact factors) are determined in operation 18. For determination of entropy and those operations that follow in FIG. 1, the directed graph is used. As discussed above, the directed graph is created for all nodes and edges that were not reduced for each subgraph. As the undirected graph is reduced, the corresponding nodes and edges are removed from the directed graph.

According to embodiments, for each node $E_i$ (in the directed graph) an "impact factor" or entropy $F(E_i)$ is calculated (for simplicity denoting it as $F(i)$), where $E_i(1)$, $E_i(2)$, ..., $E_i(N)$ are its neighbor nodes, such that all the conditional probabilities $P(E_i(n)|E_i)$, $n=\overline{1,N}$ exist.

To weigh the impact of an event $E_i$ on a set of correlated events, which describes how likely relative to the other events the event is to be a root cause, $E_i(1)$, $E_i(2)$, ..., $E_i(N)$ represented by:

$$E_i^s = \bigcup_n E_i(n)$$

a conditional entropy measure can be applied:

$$H(E_i^s \mid E_i) = -\sum_{E_i(1), E_i(2), \ldots, E_i(N)} P(E_i, E_i(1), E_i(2), \ldots, E_i(N))$$
$$\log P(E_i(1), E_i(2), \ldots, E_i(N) \mid E_i),$$

where $P(E_i, E_i(1), E_i(2), \ldots, E_i(N))$ and $P(E_i(1), E_i(2), \ldots, E_i(N)|E_i)$ are the corresponding joint and conditional probability distributions, respectively. In the general ease of root cause events, nodes are arranged according to decreasing order of the entropies.

According to embodiments, the following impact formula weighs the risk of an event $E_i$ together with its influence on a set of correlated events:

$$X_i = F(E_i) = P(E_i) \sum_{n=1}^{N} P(E_i(n) \mid E_i)$$

where $$\sum_{n=1}^{N} P(E_i(n) \mid E_i)$$

can be interpreted as a "probability flow" from $E_i$. Probability flow is a measurement of the sum of all entropy. It takes into account the amount of information for a particular node. The more information, the more likely the node is the root cause event.

It is noteworthy to point out that entropy as used herein utilizes the principles of Shannon's entropy (C. E. Shannon, *A Mathematical Theory of Communication*, 27 THE BELL SYSTEM TECHNICAL JOURNAL 379-423 (July, October 1948), which is incorporated by reference herein). Generally, entropy measures the amount of information contained in a node.

Historical List(s) of Recommendations

Figure 6:
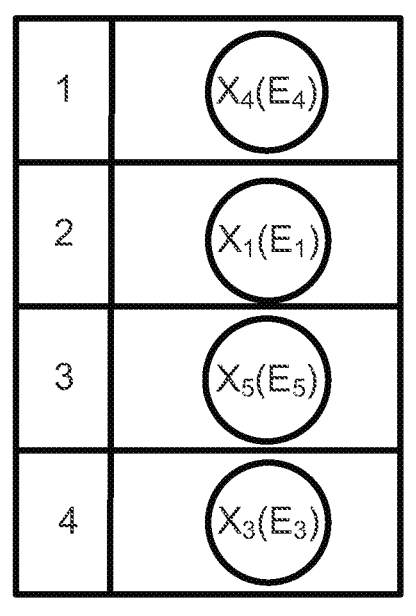
Figure 7:
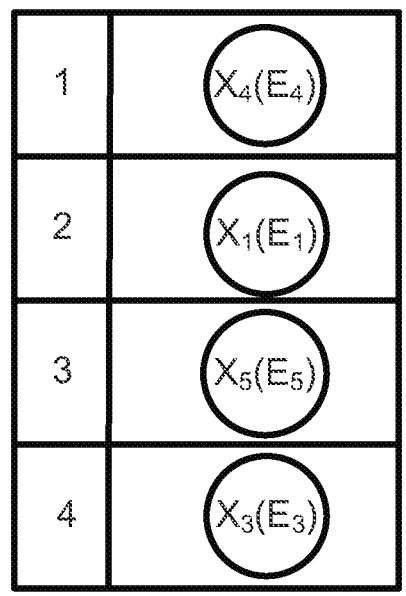
FIG. 7 is a table illustrating a list of exemplary nodes in ascending order of entropy for two subgraphs of FIG. 5.
Figure 7:
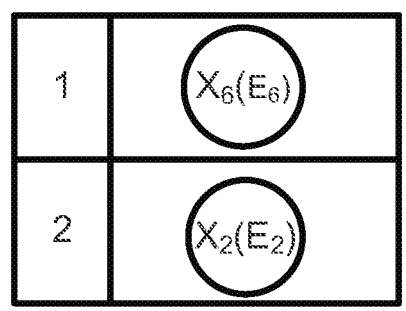

Turning again to FIG. 1, once entropies are determined, one or more historical recommendation lists can be created in operation 20. According to embodiments, once entropies are determined for each event, the nodes are then sorted according to entropy value ($X_i$) in operation 22. FIG. 6 illustrates an example of the recommendation list of events, sorted in decreasing entropy value, for the connected graph of FIG. 4. Based on the historical data, the user should be advised to consider $X_4$ as the most likely root cause, and then $X_1$, $X_5$, and finally $X_3$, in that order, according to the exemplary embodiment shown.

Where subgraphs exist, the nodes in each subgraph are sorted in decreasing order relative to the other nodes in the same subgraph. FIG. 7 illustrates and ordering of the subgraphs of FIG. 5 into to disparate ordered recommendations lists for the historic data.

According to embodiments, each list can be prioritized according to one or more criteria. The prioritization process resolves how to order events from multiple subgraphs into a general list. For example, the subgraph with maximum number of nodes (the most wide-penetrable area for a root cause) is recommended in the first position in the general recommendation list as the event with the lowest entropy in that list is most likely to be a root because its effect in causing the largest number of other events. According to embodiments, equal-size subgraphs are prioritized according to their "weights," namely, the sum of prior probabilities of the nodes comprising the subgraphs. According to embodiments, for final display of historical recommendations, in each sub-list a further filtering is applied to remove the nodes which are left without descendants, i.e., those nodes that have no conditional probability to cause another event. Moreover, a user defined parameter is provided to control the number of displayable recommendation sub-lists subject to cardinality criterion, according to embodiments.

Relative Recommendation Index (RRI) Computation

According to embodiments, a relative recommendation index (RRI) is computed in operation 24. The RRI shows the relative "strength" of a recommendation relative to the top element of the recommendation list (with highest index being 100), to each $i^{th}$ node underneath an index is assigned a value according to the formula:

$$RRI(i) = 100 - \frac{F(1) - F(i)}{F(1)} 100, \, i > 1,$$

where $F(i)$ is the impact factor for the $i^{th}$ node, $i \geq 1$, where $RRI(i) \in (0,100]$. To reduce the ultimate displayable recommendation list, a user defined parameter is set to a value between 0 and 100. It indicates the set of nodes which have RRI above that value.

Lists Arrangement Subject to List Relative Rank (LRR)

According to embodiments, a list relative rank (LRR) is computed in operation 26, which resolves the recommendations for subgraphs into a single recommendation list. According to embodiments, the LRR rank is defined by the "probabilistic weight" of the corresponding subgraph that is defined as the sum of prior probabilities of subgraph's nodes (events). Because the list shows a relative rank, the scale for the list is arbitrary. For example, the list can be one to one hundred, or one to one thousand.

According to embodiments, let $V_k$ be the set of nodes (here denoted by v) of the $k^{th}$ subgraph. The weight of $V_k$ is measured as follows:

$$W(V_k) = \sum_{v \in V_k} P(v).$$

Assuming that events are already indexed in their decreasing order, and $W(V_1)$ is the maximum then:

$$LRR(V_1) = 100, LRR(V_k) = 100 - \frac{W(V_1) - W(V_k)}{W(V_1)} 100,$$

$$k = 2, \ldots, K.$$

where K is the total number of subgraphs. Note that this exemplary example uses a 100 point scale to show the list relative rank recommendation.

Active Mode

Active Events Mapping and Displaying the Recommendations

According to embodiments, the historical lists are compared to active events in real-time or non-real-time events in operation 32. In each historical list, those recommendations that correspond to the current active events are indicated (denoted by $a_{k,s}$ for the $k^{th}$ list doubly indexed with s=1, ..., $S_k$). According to embodiments, the RRI computation operation as for the historical mode for each list is applied and the result as a final recommendation list for the active mode root cause check is displayed. The positions for active resources are recomputed according to the "probability flow" and listed in decreasing order.

According to embodiments, entropy in the active mode is calculated thus:

$$F(a_{k,s}) = \sum_{n=1}^{N_{k,s}} P(a_{k,s}(n) | a_{k,s})$$

for each active node from each list, where $a_{k,s}(n)$ denotes the $n^{th}$ neighbor of $a_{k,s}$ among $N_{k,s}$. Let for each k the numbers $F(a_{k,s})$ be already indexed (by s) in their decreasing order. Now we get:

$$RRI(a_{k,1}) = 100,$$

$$RRI(a_{k,s}) = 100 - \frac{F(a_{k,1}) - F(a_{k,s})}{F(a_{k,1})} 100,$$

$$s = 2, \ldots, S_k, k = 1, \ldots, K.$$

According to embodiments, active mode recommendations are output to a user in operation 34. Active mode recommendations allow a user to be notified of potential events before the event actually occurs. For example, in the context of an IT infrastructure, problems can be detected prior to their occurrence based on the recommendations being provided in the active mode, allowing for the potential problems to be addressed prior to the actual occurrence of the problem in the IT infrastructure.

Impacted Resources Display

According to embodiments, for each recommendation a sub-list of impacted resources is optionally provided in operation 36 of FIG. 1. Providing such a list allows a user to further aggregate useful information for user review. For example, a single resource may have multiple metrics monitored. If the resource is having a problem, many or all of the metrics may be impacted, which would show multiple root causes for the same resource. But outputting the impacted resource, a user need only focus on the resource itself rather than received information for each and every metric.

For each recommendation node, those neighbors that are end points of the arrows coming from that node are separated and listed in decreasing order of corresponding conditional probabilities. Then apply the technique of step 6 on those conditional probabilities to further organize the list of impacted resources.

EXAMPLES

The methods, devices, and systems disclosed herein can be used for special interests for the user. In particular, the following examples represent embodiments of useful analyses that can be performed using the graphs created according to this disclosure.

Example 1

Roots, Critical Node, Critical Paths

The methods, devices, and systems of this disclosure can be used to revealing or categorize critical sectors, nodes, and connections in a complex system.

Figure 8:
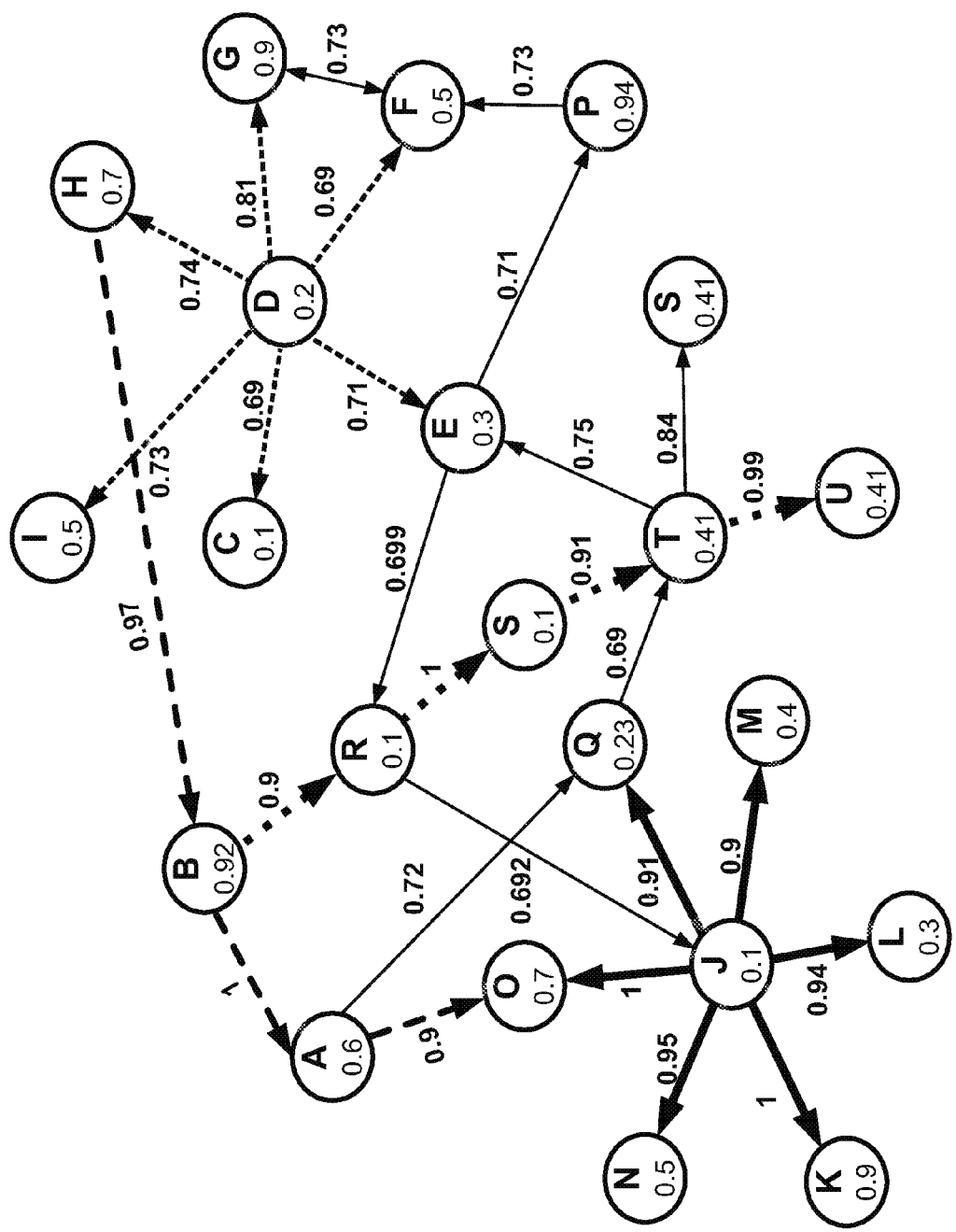
FIG. 8 is a directed graph of events and conditional probabilities illustrating roots, critical paths, and extreme paths.

Use to determine the critical sectors, nodes, and connections consist of use of both the historic and active nodes. Each of these provided data about the complex system regarding sources of event cascades, or event paths once a single event occurs. The historical analysis produces categorizations for the past events data. In the active mode, a mapping of current events is built into the historical analysis to better understand the critical sectors, nodes, and connections. According to embodiments and based on the directed graph created as described above, the following categories of criticality are defined:

A critical node is a node that has prior probability that is equal to or greater than the value of an upper threshold. The upper threshold is user definable. For example, if the upper threshold=0.9, FIG. 8 nodes B, G, K and P would be considered critical nodes.

A root is a node that is historically an impacting only resource (i.e., no other event predicts or causes this event). In other words, the root has no "incoming" arrows. An example of a root note is node D in FIG. 8.

A critical path is a sequence of impacting nodes with extremely high conditional probabilities on the connections. For example the path BRSTU in FIG. 8 comprises a critical path, denoted by the squared line. Accordingly, each of the conditional probabilities on the path is greater than or equal to 0.9. A critical path denotes a cascade of events that nearly always happen together or in a sequence together.

An extreme path is a critical path with nodes that have prior probability that is equal to or greater than the value of an upper threshold. For example, path HBAO in FIG. 8 (denoted by the dashed line), where the upper threshold is equal to 0.5, comprises an extreme path. Note that in active mode the critical and extreme paths are an appropriate source of predictions.

A critical sector of some magnitude M (defined by its nodes volume) is a connected subgraph with the joint probability connections all higher than some value.

Example 2

Bottlenecks

A bottleneck is a resource (e.g., a component in an IT infrastructure) or group of resources with significant impact on the complex system. Bottlenecks are resources with persisting presence in events of the complex system, highly recommendable in a historic recommendation list, largely deviating from the rest of resources in their relative recommendation index (RRI). The methods, devices, and systems of this disclosure can be used to optimize users' efforts in bottlenecks localization or identification, and where necessary removal. A guide in form of a recommendation list (RL) is produced for the user to decide on the most probable resources of bottleneck origin. If the bottleneck is not unique, then it recognizes separable origins resulting in several RLs. The methods, devices, and systems disclosed herein are configurable to give recommendations on resource and tier levels, coming from the basic level analysis. Each recommendation in an RL is positioned according to its likelihood, or RRI. RRI shows how much the recommendation deviates from the top one in its confidence. In case of multiple bottlenecks, the respective parallel RL's are prioritized according to their "weight" or list relative rank (LRR).

Figure 9:
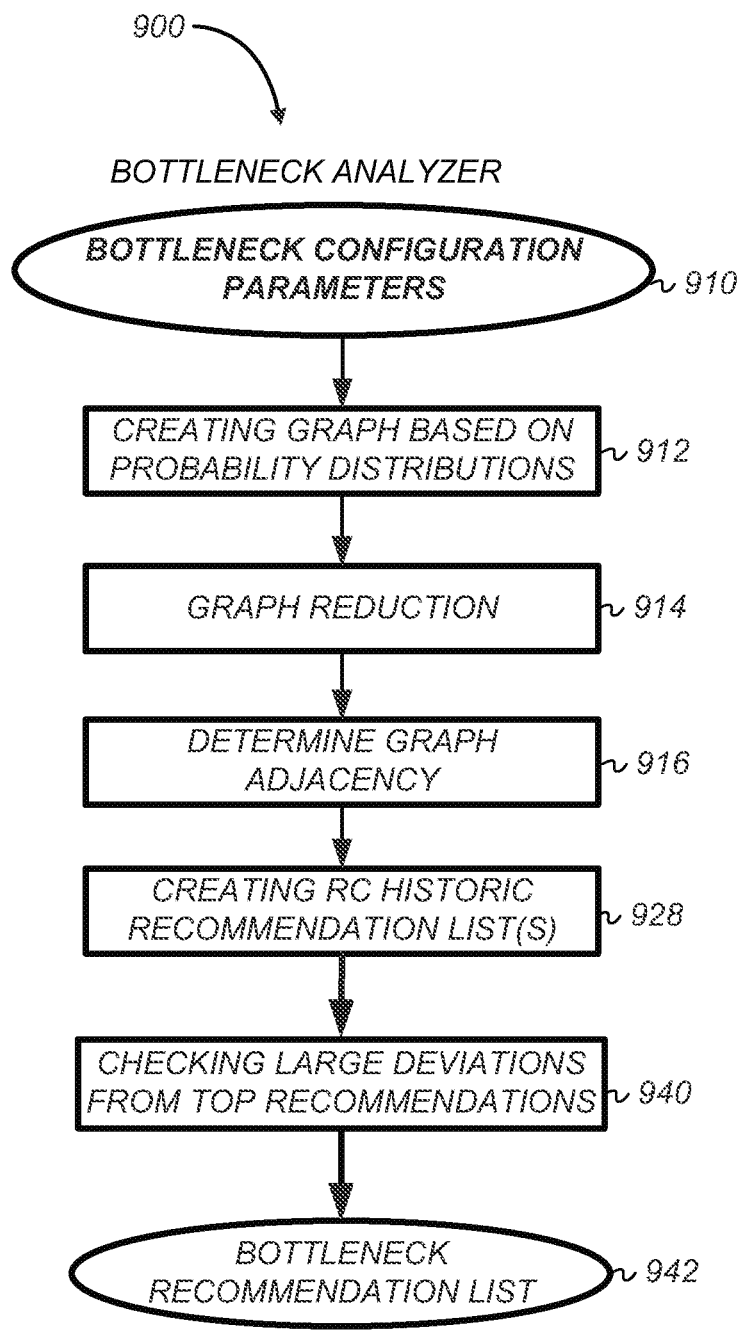
FIG. 9 is a flow diagram illustrating a bottleneck analyzing process.

According to embodiments, FIG. 9 illustrates a flow chart similar to the flow chart illustrated in FIG. 71, but specifically adapted for bottleneck analysis. In operation 910, the user sets user configurable parameters for the analysis. In operation 912, a graph is created as disclosed herein based on probability distributions. In operation 914, graph reduction is performed as disclosed herein. Graph adjacency is determined in operation 916. In operation 928, root cause recommendation lists are generated as disclosed herein. In operation 940, large deviations from the top recommendations are flagged.

For example, Table 1 shows a typical historical root cause recommendation lists. Detected bottlenecks are shown underlined. Their RRI's deviate largely from the rest of resources in the same list. In the third sub-list the absence of the bottleneck is due to the closeness of the RRIs. In the fourth sub-list the absence of the bottleneck is due to the shortness of the list, which illustrates limitations to the instant bottleneck analysis.

TABLE 1

| Sub-List N | List Relative Rank | Resource ID | RRI |
|---|---|---|---|
| 1 | 100 | <u>27</u> | <u>100</u> |
|  |  | <u>26</u> | <u>99</u> |
|  |  | <u>17</u> | <u>98</u> |
|  |  | 18 | 20 |
|  |  | 8 | 18 |
|  |  | 11 | 18 |
| 2 | 90.2 | <u>14</u> | <u>100</u> |
|  |  | 24 | 56 |
|  |  | 15 | 55 |
|  |  | 10 | 40 |
|  |  | 32 | 40 |
|  |  | 33 | 39 |
| 3 | 40.7 | 12 | 100 |
|  |  | 29 | 99 |
|  |  | 23 | 98 |
|  |  | 9 | 98 |
| 4 | 21.9 | 28 | 100 |
|  |  | 19 | 50 |

In operation 942, an RL of potential bottlenecks are output to a user. The RL will detail the resources that appear to cause bottlenecks.

Example 3

Black Swans

Figure 10:
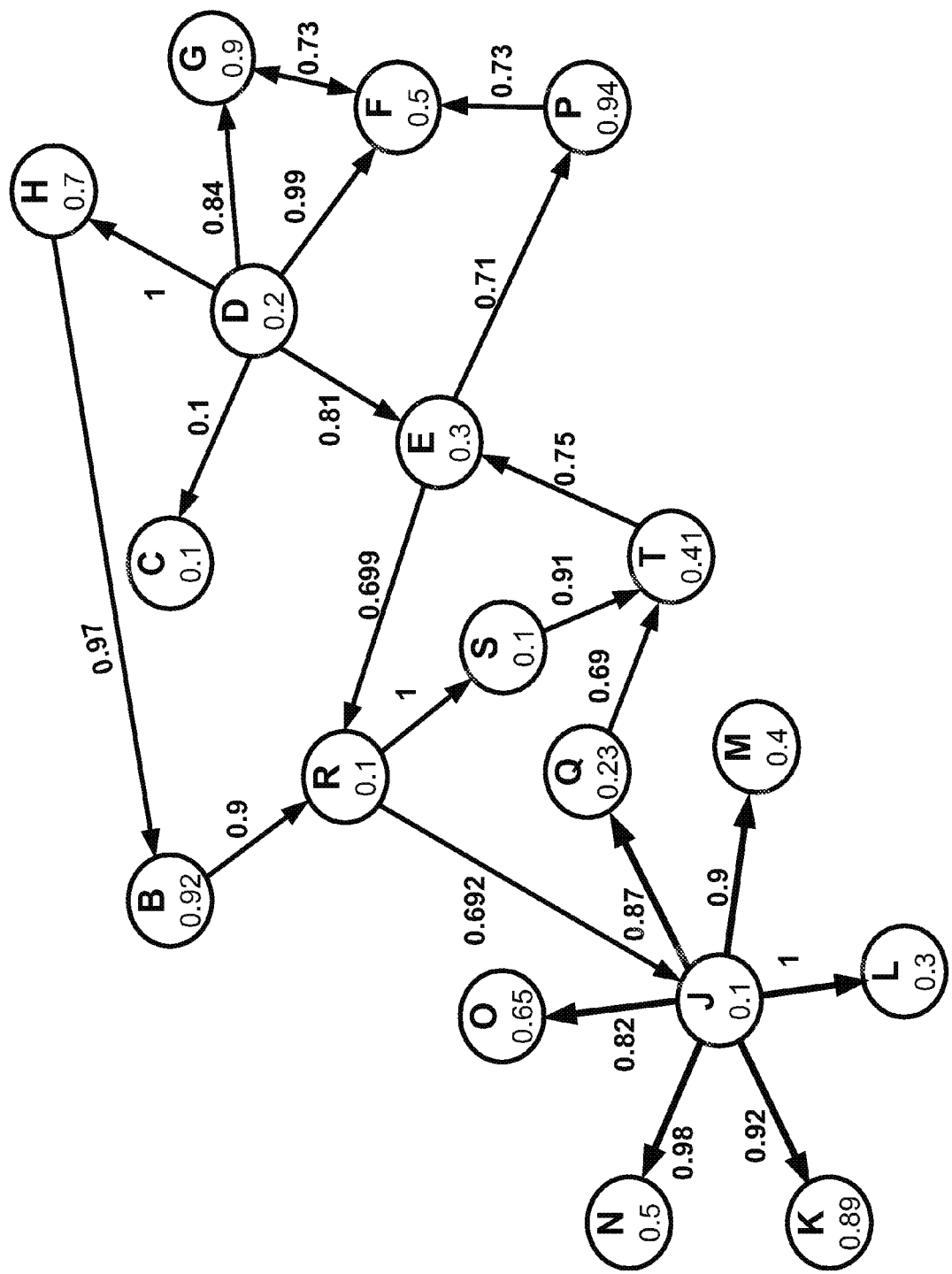
FIG. 10 is a directed graph of events and probabilities illustrating use of the graphs to reveal black swan events.

Black swan events are events that have very low prior probability, but extremely high impacting ability on a large set of neighbors. FIG. 10 illustrates a black swan event with nodes J and D. Node J has a prior probability of 0.1, but when it occurs, events L, K, M, N, O, and Q are nearly always observed. Moreover, when Q is triggered, nodes TEPFG are often triggered as well. So although node J has a low prior probability, if it occurs, it tends to impact the complex system and trigger of other events. As illustrated in FIG. 10, nodes J and D impact nearly three quarters of the nodes shown in the graph.

Figure 11:
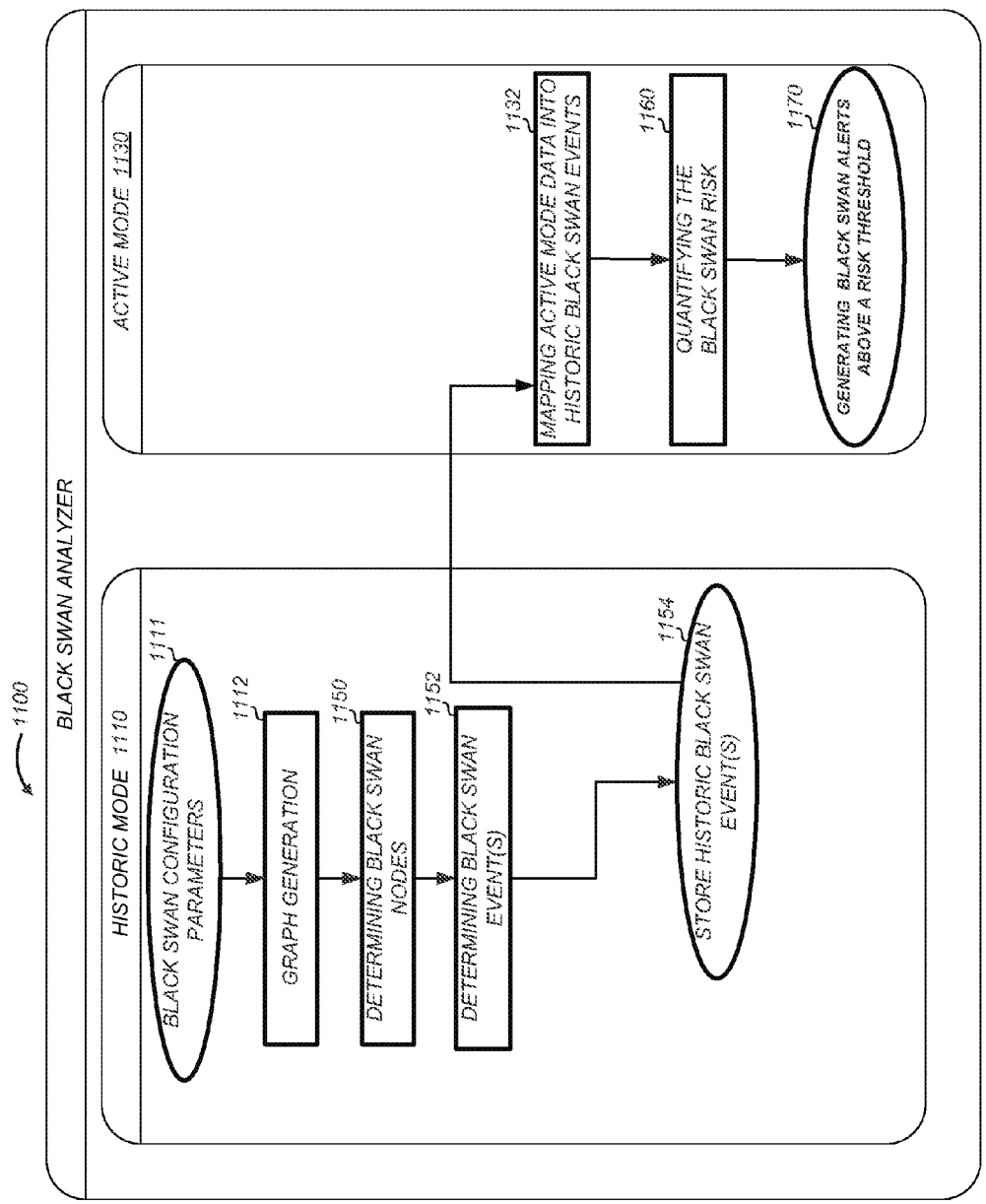
FIG. 11 is a flow diagram of an embodiment of a process for analyzing black swans.

FIG. 11 is an embodiment of a black swan analyzer 1100. Black swan analyzer 1100 detects black swan events in historic data in an historic mode 1110 and applies historic black swan event data with active mode data in an active mode 1130. In operation 1111, a user is able to set user definable parameters such as the maximum prior probability, minimum edge probability, or a percentage of nearby nodes that the node in question affects that are required for a node to be a black swan.

In operation 1112, a graph is generated as disclosed herein. Based on the parameters set, black swan nodes are determined in operation 1150. From the black swan nodes, the black swan events are determined in operation 1152 and the resulting data is stored in operation 1154 for use in active mode 1130.

In active mode 1130, historic black swan data is mapped to active mode data 1132. The results of that analysis allow for quantification of a risk of a black swan event in process 1160. According to embodiments, the quantification of the black swan risk (BSR) varying from 0 to 100 is performed as follows. The black swan event is determined by the black swan nodes that cover C % (a threshold) of the graph. In on-line mode, if at the time T the black swan nodes impact/cover R % of those (C %) nodes, then the BSR as a function of T is BSR(T)=R. Because the black swan events are difficult to detect due to their low prior probabilities and because the methods, systems, devices of this disclosure cannot absolutely predict black swan events, but rather can only suggest the most probably events that were the black swan event, process 1160 accounts for the uncertainty inherent in the processes described herein and provides output in the form of a quantification metric to a user in process 1170. According to embodiments, as real-time events begin to resemble graphs or paths known or believed to be triggered by a black swan event, the risk quantification can be adjusted in real-time to reflect the greater certainty that a black swan event occurred. Knowing the black swan event occurred allows users to take appropriate action ahead of events that occur downstream from the black swan event.

FIG. 12 is a block diagram of a representative computing environment 1200 that may be used to host the processes, methods, and analyzers discussed above. Of course, many other computing configurations may be employed.

Computing environment 1200 includes computer system 1202. Computer system 1202 comprises a bus 1204, with CPUs 1206, main memory 1208, non-transitory persistent storage media 1210, data and storage network interfaces 1212, and other I/O 1214. Note that bus 1204 will typically be implemented as an interconnection fabric comprising a variety or bus and point-to-point interconnects.

Code implementing the processes, methods, and analyzers discussed above may exist and be present in various forms in non-transitory persistent storage media 1210, main memory 121018, and cache memories of CPUs 1206.

Data and storage network interfaces 1212 couple computer system 1202 to other data and storage networks, which are not shown in FIG. 12. Other I/O 1214 represents all other forms of I/O, and in FIG. 12, other I/O 1214 is shown as being coupled to USB, Firewire, and Bluetooth devices 1218, display 1216, and keyboard and mouse/touch interface 1220. Of course, many other forms of I/O are known in the art. Block 1222 represents a user interacting with the I/O devices represented by blocks 1216, 1218, and 1220.

Finally, block 1224 represents historical event data entering computer system 1202. The historical event data may enter via data and storage network interfaces 1212, blocks 1218 or 1220, or any other method known in the art.

In one aspect, the devices and systems of this disclosure include at least one central processing unit (CPU) or processor. The CPU can be coupled to a memory, ROM or machine readable media containing the compute-executable instructions for generating and using fingerprints for integrity management. Machine readable media can be any available media that can be accessed by the system and includes both volatile and nonvolatile media, removable and non-removable media implemented in any method or technology for storage of information such as computer readable instructions, data structures, program modules or other data. Machine readable media includes, but is not limited to, RAM, ROM, EEPROM, flash memory, portable memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the systems and devices disclosed herein. Combinations of any of the above should also be included within the scope of machine readable media. The machine readable media may store instructions or data which implement all or part of the system described herein.

Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media.

In various embodiments, the methods disclosed herein, as well as the systems and devices discloses, are operational in an information technology infrastructure or with numerous other general purpose or special purpose computing system environments or configurations. Examples of well known computing systems, environments, or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The methods disclosed herein may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

While the apparatus and methods have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for determining a causative event in an information technology infrastructure comprising:
   collecting historical event data with a computer;
   generating an undirected graph, each node being an event and each edge being a joint probability of two events historically occurring simultaneously;
   generating a directed graph, each node being the event and each edge being a conditional probability of a second event occurring if a first event occurs;
   reducing the undirected graph by discarding edges based on mutual information calculated for each edge;
   reducing the directed graph by discarding edges that correspond to discarded edges of the undirected graph; and
   from the directed graph, creating and outputting an historical list of recommendations to a user, the historical list of recommendations comprising an at least one event deemed to be the most likely causative event.

2. The method of claim 1, further comprising
   comparing active events against the historical events of the directed graph;
   identifying current active events that correspond to events in the historical list of recommendations; and
   from the identified active events, creating and outputting a list of active mode recommendations comprising an at least one event deemed to be potentially a causative event.

3. The method of claim 1, wherein the creating and outputting of the historical list of recommendations comprises determining entropy for the nodes of the directed graph.

4. The method of claim 3, wherein the at least one event deemed to be the most likely causative event are the events having the lowest entropy.

5. The method of claim 3, wherein the creating and outputting of the historical list of recommendations further comprises determining a relative recommendation index.

6. The method of claim 5, wherein the at least one event deemed to be the most likely causative event are the events having the highest relative recommendation index.

7. The method of claim 5, wherein the creating and outputting of the historical list of recommendations further comprises:
   determining a list relative rank;
   wherein the at least one event deemed to be the most likely causative event are the events having the highest list relative ranks.

8. The method of claim 1, further comprising determining at least one of root nodes, critical nodes, critical paths, extreme paths, and critical sectors from at least one of the historical list of recommendations and the directed graph.

9. The method of claim 1, further comprising determining bottlenecks from at least one of the historical list of recommendations and the directed graph.

10. The method of claim 1, further comprising determining black swan events from at least one of the historical list of recommendations and the directed graph.

11. A non-transitory machine readable medium with instructions stored thereon for determining a causative event in an information technology infrastructure comprising:
   collecting historical event data with a computer;
   generating an undirected graph, each node being an event and each edge being a joint probability of two events historically occurring simultaneously;
   generating a directed graph, each node being the event and each edge being a conditional probability of a second event occurring if a first event occurs;
   reducing the undirected graph by discarding edges based on mutual information calculated for each each edge;
   reducing the directed graph by discarding edges that correspond to discarded edges of the undirected graph; and
   from the directed graph, creating and outputting an historical list of recommendations to a user, the historical list of recommendations comprising an at least one event deemed to be the most likely causative event.

12. The machine readable medium of claim 11, further comprising
   comparing active events against the historical events of the directed graph;
   identifying current active events that correspond to events in the historical list of recommendations; and
   from the identified active events, creating and outputting a list of active mode recommendations comprising an at least one event deemed to be potentially a causative event.

13. The machine readable medium of claim 11, wherein the creating and outputting of the historical of recommendations comprises determining entropy for the nodes of the directed graph.

14. The machine readable medium of claim 13, wherein the at least one event deemed to be the most likely causative event are the events having the lowest entropy.

15. The machine readable medium of claim 13, wherein the creating and outputting of the historical list of recommendations further comprises determining a relative recommendation index.

16. The machine readable medium of claim 15, wherein the at least one event deemed to be the most likely causative event are the events having the highest relative recommendation index.

17. The machine readable medium of claim 15, wherein the creating and outputting of the historical list of recommendations further comprises:
   determining a list relative rank;
   wherein the at least one event deemed to be the most likely causative event are the events having the highest list relative ranks.

18. The machine readable medium of claim 11, further comprising determining at least one of root nodes, critical nodes, critical paths, extreme paths, and critical sectors from at least one of the historical list of recommendations and the directed graph.

19. The machine readable medium of claim 11, further comprising determining bottlenecks from at least one of the historical list of recommendations and the directed graph.

20. The machine readable medium of claim 11, further comprising determining black swan events from at least one of the historical list of recommendations and the directed graph.

* * * * *